INVENTOR.
IVAN L. TROFIMOV
BY Watts, Hoffmann
Fisher & Heinke
ATTORNEYS.

United States Patent Office 3,491,608
Patented Jan. 27, 1970

3,491,608
PULLEYS
Ivan L. Trofimov, Chagrin Falls, Ohio, assignor to
Speed Selector, Inc.
Filed May 17, 1968, Ser. No. 729,957
Int. Cl. F16h 55/52
U.S. Cl. 74—230.17                                6 Claims

ABSTRACT OF THE DISCLOSURE

An adjustable control pulley for use in a variable speed drive having a fixed pulley face mounted on an inner sleeve, a control shaft rotatably mounted within the sleeve by axially spaced bearings which are positioned to prevent axial deflection of the control shaft, and a movable pulley face which is slidable on the sleeve and has an outboard end rotatably supported on the control shaft.

BACKGROUND OF THE INVENTION

This invention relates generally to variable speed drive mechanisms, and more specifically to new and improved adjustable or variable pitch pulley constructions.

Adjustable speed belt drives of the type having driving and driven pulleys operatively connected by a belt conventionally include pulley structures having adjustable diameters so that a variation in the speed ratios of the pulleys can be obtained. The usual pulley structure is comprised of a pair of opposed cone discs or pulley halves which cooperate with a V-belt, the variation in effective pitch diameter being obtained by adjusting the axial spacing of the pulley halves on a supporting shaft or sleeve. By moving the pulley halves close together, the belt is caused to move radially outwardly along the conical faces of the pulley halves, thereby producing an increased pitch diameter. When the pulley halves are drawn apart, the belt moves radially inwardly along the faces of the pulley halves to decrease the effective pitch diameter. In drive systems in which the driving and driven pulleys operate on fixed shaft center distances, the driving pulley is customarily provided with a mechanical actuating mechanical actuating mechanism for effecting relative movement between the pulley halves.

A conventional adjustable pulley of the type generally described above is comprised of a movable pulley face having a sleeve-type bushing usually made of metal and/or plastic fixed in its hub which is axially slidable on a hollow metal shaft toward and away from a fixed pulley face. A control rod or shaft has one end rotatably supported within the hollow shaft by either a single or a two-row type ball bearing. The control rod projects from the hollow shaft and is threadedly connected to the movable pulley face so that it can be adjustably positioned relative to the fixed pulley face.

The foregoing pulley construction of the prior art is relatively difficult to manufacture, since the sleeve-type bushing, the inner surface of the hub of the movable pulley face and the hollow supporting shaft must be carefully formed to close dimensional tolerances in order that the control shaft will be concentric in the hollow shaft and will run true in the single or two-row ball bearing. During operation of such a pulley, the drive belt exerts a cocking force on the movable pulley face. If the movable pulley face is somewhat loose on the hollow supporting shaft, either because of machining inaccuracies or simply because of bushing wear, the cocking force will be transmitted to the control shaft causing it to deflect axially and to be misaligned in the ball bearing, thereby resulting in overheating of the bearing and premature failure.

SUMMARY OF THE INVENTION

The present invention provides a new adjustable pulley for use in fixed center variable speed drives which avoids the foregoing problems of the prior art. More specifically, the invention provides a new adjustable pulley having a control shaft which is supported in an improved manner against axial deflection with respect to an inner shaft or sleeve on which the fixed pulley face is mounted. The movable pulley face has an elongated hub slidable on the inner sleeve or shaft and an outboard end supported by the control shaft. The mounting of the control shaft prevents axial deflection thereof and assures that the various parts of the pulley, including the inner shaft or sleeve, the movable pulley face and the control shaft, will be coaxial and will run true during use so as to minimize or eliminate misalignment and uneven wear of the drive belt. Further, the outboard end of the movable pulley face is supported in such a manner as to minimize the loading on the bearings, thereby improving the life of the pulley. Still another advantage of the present invention is that the pulley can be relatively easily and inexpensively manufactured because of the fact that the tolerance requirements, particularly of the bearings and the bearing supporting surfaces, are not as great as in conventional constructions.

An object of the present invention is to provide an adjustable pulley having a control shaft which is used to partially support the movable face of the pulley and which is mounted in such a manner as to prevent axial deflection thereof due to cocking forces imposed on the movable pulley face by the drive belt, thereby assuring that the various parts of the pulley will be coaxial and will run true during use.

Another object of the present invention is to provide an adjustable pulley having an inner sleeve which carries a fixed pulley face, a control shaft which is supported within the inner sleeve against relative axial deflection, and a movable pulley face having an elongated hub slidable on the sleeve and an outboard end supported on the control shaft.

A further object of the present invention is to provide an adjustable pulley having an inner sleeve which carries a fixed pulley face, a control shaft supported within the inner sleeve by axially spaced ball bearings so as to prevent axial deflection of the control shaft relative to the sleeve, and a movable pulley face having an elongated hub slidable on the sleeve and an outboard end supported by a ball bearing on the control shaft.

Still another object of the present invention is to provide an adjustable pulley having an inner shaft or sleeve which carries a fixed pulley face, a control shaft supported by bearings within the inner sleeve against relative axial deflection, and a movable pulley face having an area of sliding engagement with the inner sleeve and an outboard end supported by a bearing on the control shaft, the outboard end of the movable pulley face being supported on the control shaft at a location which is widely spaced from its area of sliding engagement on the inner sleeve so as to minimize the loads imposed on the bearings.

A further object of the present invention is to provide a new adjustable pulley construction as generally described above which can be relatively easily and inexpensively manufactured.

Other objects and advantages and a fuller understanding of the invention will be had by reference to the following detailed description taken in conjunction with the accompanying drawing.

DESCRIPTION OF THE PREFERRED EMBODIMENT

Figures 1, 2, 3:
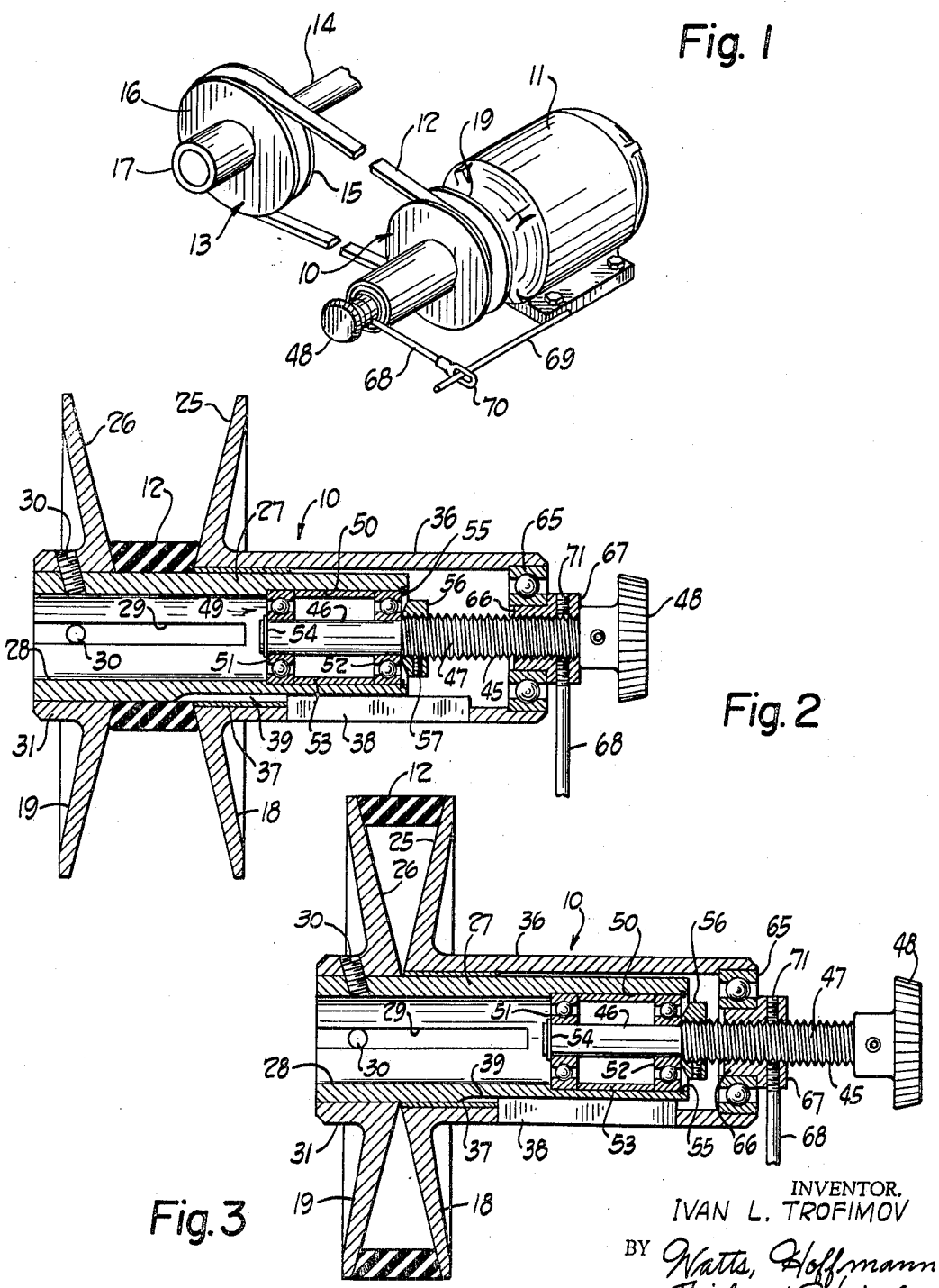
FIGURE 1 is a perspective view diagrammatically illustrating the variable pitch pulley of the present invention incorporated in a typical, adjustable speed belt drive.
FIGURE 2 is a cross-sectional view showing the new variable pitch pulley in one position of pitch adjustment.
FIGURE 3 is a cross-sectional view similar to FIGURE 2 showing the pulley in another position of pitch adjustment.

Referring now to the drawing, and to FIGURE 1 in particular, there is shown a fixed center drive comprising a variable pitch control pulley 10 of the present invention which is mounted on the drive shaft of a stationary motor 11. The control pulley 10 is drivingly connected by a V-belt 12 to a companion pulley 13 which is mounted on a driven shaft 14. The illustrated companion or driven pulley 13 may be of a conventional construction comprised of a fixed cone disc or pulley half 15 and an opposed, laterally movable cone disc or pulley half 16. The movable pulley half 16 is loaded by a spring (not shown) within a housing 17 and is urged by the spring toward the fixed half 15.

It will be understood that the speed at which the shaft 14 is driven can be varied by changing the pitch diameter ratios of the pulleys 10, 13. With the pulleys mounted on fixed centers as illustrated in FIGURE 1, this change in the ratio of pitch diameters is effected by means of a manually operated control mechanism which forms an integral part of a motor pulley 10. As will be more fully described, the manual control mechanism is operable to adjust a movable half or face 18 of the pulley 10 toward and away from a fixed half or face 19. When the movable face 18 is adjusted toward the fixed face 19 of the pulley 10, the pitch diameter of the pulley is increased and the drive belt 12 is pulled down to a smaller pitch diameter on the companion pulley 13 by laterally moving the pulley half 16 against the force of the loading spring. Thus, the shaft 14 will be driven at an increased speed. Conversely, when the movable face 18 of the pulley 10 is adjusted away from the fixed face 19, the pitch diameter of the pulley 10 is decreased, while the pitch diameter of the companion pulley 13 is increased by movement of the movable half 16 toward the fixed half 15 under the action of the loading spring. This causes the shaft 14 to be driven at slower speeds. In this manner, the illustrated drive is effective to obtain infinite speed variation within the wide ratio range of the effective pitch diameters of the pulleys 10, 13.

Reference is now made to FIGURES 2 and 3 which illustrate the preferred embodiment of the control pulley 10. As shown, the pulley faces or halves 18, 19 of the pulley 10 have conical surfaces 25, 26, respectively, which drivingly engage the sides of the V-belt 12. Both pulley halves are engaged on a hollow shaft or sleeve 27 which is adapted to be received on the drive shaft of the motor 10. The bore 28 of the sleeve 27 may be formed with a keyway 29 which receives a key (not shown) for locking the sleeve 27 against relative rotation on the motor shaft. The pulley half 19 is fixed on one end of the sleeve 27 by set screws 30 which extend through holes in a hub portion 31 of the pulley half 19. The set screws 30 may be threaded through the wall of the sleeve 27 into engagement with a motor shaft (not shown) extending therein so as to lock the sleeve 27 against axial movement.

The pulley face 18 is movable axially on the sleeve 27 toward and away from the fixed pulley face 19. In accordance with the present invention, the movable pulley face 18 includes a long, sleeve-like hub portion 36 which extends beyond the end of the sleeve 27. A relatively short sleeve 37 carried within the hub 36 adjacent its inboard end is slidably engaged on the sleeve 27. The pulley face 18 is locked against rotational movement relative to the sleeve 27 by a key 38 which is carried by the hub 36 and is received in a keyway 39 formed along the sleeve 27 from its inner end.

The outboard end of the sleeve-like hub 36 is rotatably supported by control shaft 45 which can be turned to adjust the position of the movable pulley face 18. In the illustrated construction of the present invention, the control shaft 45 has a rod-like end portion 46 extending axially within the sleeve 27, an intermediate threaded portion 47 of enlarged diameter relative to the portion 46 projecting axially outwardly from the end of the hub 36, and a handle 48 which can be grasped to turn the control shaft.

The rod-like portion 46 of the control shaft 45 is rotatably supported in the inner sleeve or hollow shaft 27 by a bearing assembly 49 which is mounted within an enlarged diameter portion 50 of the bore 28. As shown, the bearing assembly 49 is comprised of a pair of ball bearings 51, 52 which are maintained in axially spaced positions relative to the control shaft 45 by a sleeve 53 engaged between the outer races of the bearings. The outer race of the bearing 51 is held against a shoulder formed on the inside of the sleeve 27 by the enlarged diameter portion 50 of the bore 28, and the inner race of the bearing 51 is engaged by a snap ring 54 on the end of the control shaft 45. The outer race of the bearing 52 is held against a snap ring 55 carried at the end of the sleeve 27, and the inner race of the bearing 52 is engaged against a shoulder of the control shaft 45 formed by the enlarged diameter threaded portion 47. A thrust ring 56 which has a sloping end face in engagement with the inner race of the bearing 52 is mounted on the threaded portion 47 of the control shaft and is secured in place by set screws 57.

The outboard end of the hub 36 is supported by a ball bearing 65 which is pressed in the end of the hub against an inner radial shoulder thereof. The bearing 65 is mounted on a neck 66 of a nut 67 which is engaged on the treaded portion 47 of the control shaft 45. The nut 67 is prevented from turning with the control shaft during adjustment of the movable pulley face 18 by a rod 68 which extends radially from the nut 67 and by a rod or bar 69 which extends through an eye 70 at the end of the rod 68. The rod or bar 69 is fixedly mounted in any suitable manner. Set screws 71 carried by the nut 67 can be tightened into engagement with the control shaft 45 to prevent rotation thereof during operation of the pulley 10.

In FIGURE 2, the pulley faces 18, 19 are shown spaced apart to provide the minimum pitch diameter of the pulley 10, and in FIGURE 3 the pulley faces are positioned closely adjacent each other to provide the maximum pitch diameter. It will be apparent from the foregoing that the pulley face 18 can be moved between the positions shown in FIGURES 2 and 3 by loosening the set screws 71 in the nut 67 and rotating the control shaft 45. Rotation of the control shaft 45 causes the nut 67 to move along the threaded portion 47 of the control shaft, thereby producing axial sliding movement of the pulley face 18 on the sleeve 27. When the pulley half 18 has been moved to the desired position relative to the fixed pulley face 19, the set screws 71 in the nut 67 are again tightened to lock the control shaft 45 against rotation.

As in the case of all variable pitch pulleys, the driving engagement of the belt 12 with the conical surfaces 25, 26 of the pulley 10 produces a cocking force on the movable pulley face 18 which increases with the pitch diameter of the pulley. With the construction of the present invention, this cocking force is transmitted to the inner sleeve 27 through the sleeve 37 and to the control shaft 45 through the bearing 65. The length of the hub 36 of the pulley face 18 and the resulting widely spaced locations of the sleeve 37 at the inboard end of the hub and the bearing 65 at the outboard end effectively prevent any axial cocking movement of the pulley face 18. The widely spaced locations of the sleeve 37 and the bearing 65 also minimize the loading on the bearings 51, 52, 65 so as to improve the operation and life of the pulley.

The bearings 51, 52 are suitably spaced on the control shaft 45 so as to resist or support the moment produced by the force applied through the bearing 65. As compared to prior constructions which employed either a single or a two-row type bearing designed to support only axial and/or radial loads, the axially spaced bearings 51, 52 prevent cocking or axial deflection of the control shaft 45. The control shaft 45 will be maintained axially rigid with respect to the sleeve 27 even though one of the bearings 51, 52 or 65 does not run true.

It will thus be seen that the present invention has achieved the objective of providing an adjustable pulley having a control shaft which supports the outboard end of the movable face of the pulley and which is in turn supported against axial deflection relative to an inner shaft or sleeve which carries the fixed pulley face. The preferred construction of the invention, and particularly the support for the control shaft which is provided by the axially spaced bearings 51, 52, assures that the various parts of the pulley, including the inner shaft or sleeve 27, the movable face 18 and the control shaft 45, will be coaxial and will run true during use, thereby minimizing or eliimnating misalignment and uneven wear of the belt 12. At the same time, the preferred construction can be relatively easily and inexpensively manufactured because of the fact that the tolerance requirements of the bearings and the bearing-engaging surfaces are not as great as in the conventional construction embodying either sleeve-type bearings or ball bearings disposed at only two axially spaced locations.

What is claimed is:

1. An adjustable pulley comprising a sleeve, a fixed pulley half mounted on said sleeve, a movable pulley half mounted on said sleeve and including an elongated hub having an outboard end projecting beyond an end of said sleeve, said movable pulley half having an area of sliding engagement with said sleeve which is adjacent the inboard end of said hub and which is axially spaced from said one end of said sleeve, a control shaft extending coaxially within said sleeve and said hub, said control shaft having a rod-like end portion within said sleeve and a threaded portion projecting axially outwardly from the outboard end of said hub, a nut engaged on said threaded portion, a ball bearing engaged between said nut and the outboard end of said hub, and means rotatably mounting said control shaft within said sleeve so as to prevent axial deflection of said control shaft, said mounting means including a pair of bearings engaged with said rod-like end portion of said control shaft and sleeve means maintaining said bearings in axially spaced positions so that said bearings will support a moment imposed on said control shaft through said bearing at said outboard end of said hub.

2. An adjustable pulley comprising a pair of relatively movable pulley faces, one of said pulley faces having an elongated hub portion, a control shaft having an inboard end portion extending coaxially within said hub portion and an outboard end portion projecting beyond said hub portion, structure mounting said control shaft in connection with said pulley faces, said structure including axially spaced bearing means engaging said inboard end portion of said control shaft, said bearing means being spaced apart to support a moment produced by cocking force exerted on said outboard end portion of said control shaft, and means supporting the outboard end of said hub portion on said outboard end portion of said control shaft.

3. An adjustable pulley as claimed in claim 2 wherein said supporting means comprises a nut and a bearing mounted between the outboard end of said hub portion and said control shaft.

4. An adjustable pulley comprising an inner sleeve portion, a first pulley face carried on said sleeve portion, a second pulley face including an elongated hub portion having an area of sliding engagement with said sleeve portion, said hub portion having an outboard end projecting beyond an end of said sleeve portion, a control shaft extending coaxially within said sleeve portion and said hub portion, said control shaft having an outboard end projecting beyond said outboard end of said hub portion, means for mounting said control shaft within said sleeve portion and said hub portion and for preventing axial deflection of said control shaft, said mounting means including axially spaced bearings engaged between said control shaft and said sleeve portion, said bearing means being spaced apart to support a moment produced by a cocking force imposed on said outboard end of said control shaft, and means supporting the outboard end of said hub portion on said control shaft.

5. An adjustable pulley as claimed in claim 4 wherein said supporting means comprises a nut threadedly engaged on said control shaft, and bearing means engaged between said nut and the outboard end of said hub portion.

6. An adjustable pulley as claimed in claim 4 wherein said area of sliding engagement of said hub portion is adjacent its inboard end and is axially spaced from said end of said sleeve portion.

References Cited

UNITED STATES PATENTS

| 3,117,461 | 1/1964 | Fermier | 74—230.17 |
| 3,303,710 | 2/1967 | Kowalski et al. | 74—230.17 |

FRED C. MATTERN, Jr., Primary Examiner

JAMES A WONG, Assistant Examiner